Oct. 26, 1948.　　　A. G. SCHRAMM　　　2,452,267
ELEVATABLE BED TRAILER
Filed April 15, 1947　　　　　　　2 Sheets-Sheet 1
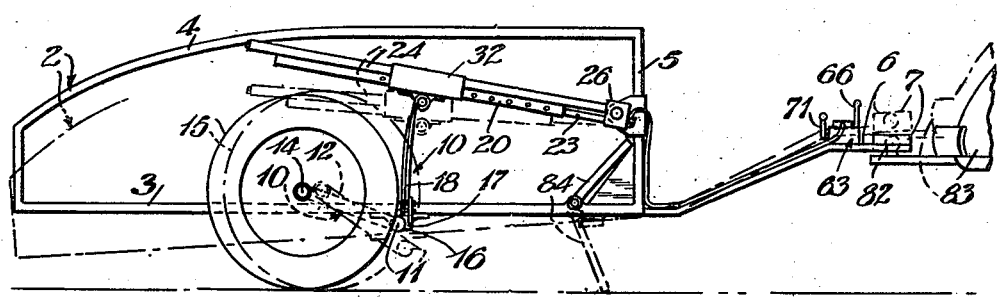
Fig. 1.
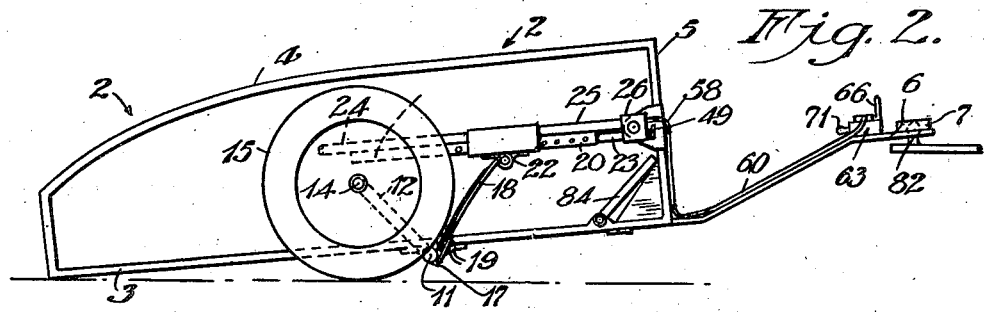
Fig. 2.
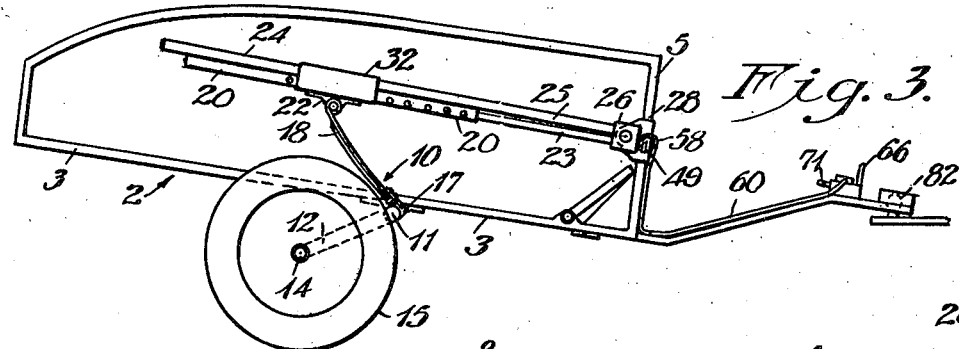
Fig. 3.
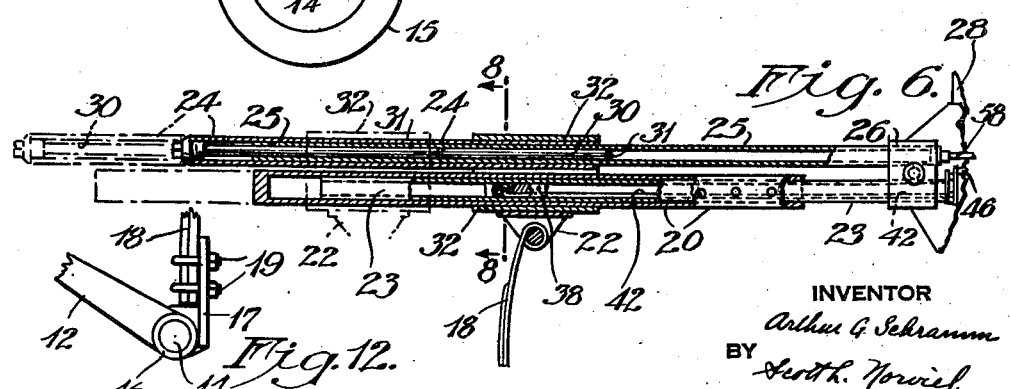
Fig. 6.
Fig. 12.
INVENTOR
Arthur G. Schramm
BY
ATTORNEY Oct. 26, 1948.  A. G. SCHRAMM  2,452,267
ELEVATABLE BED TRAILER
Filed April 15, 1947  2 Sheets-Sheet 2
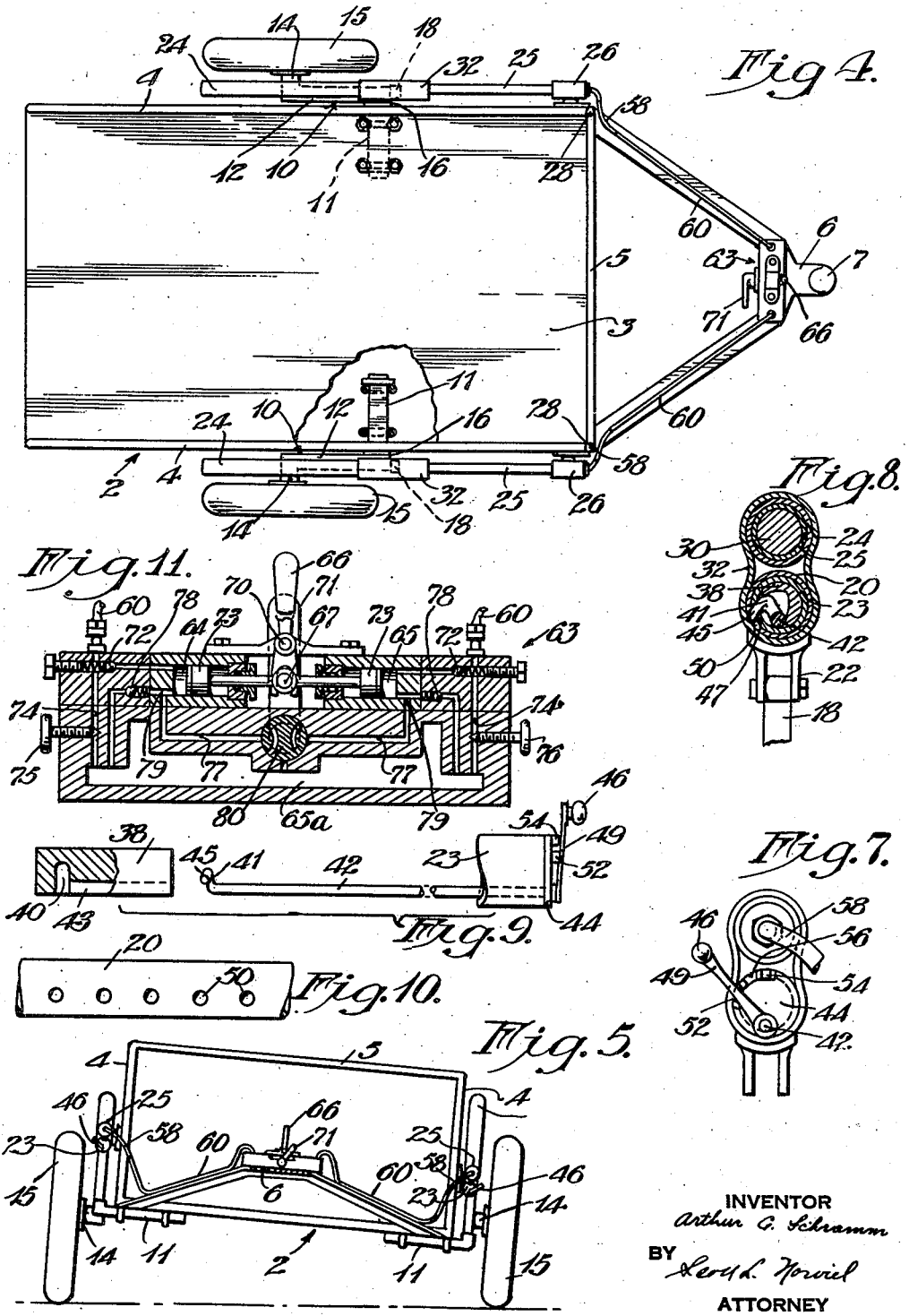
INVENTOR
Arthur G. Schramm
BY
Leroy L. Norvell
ATTORNEY Patented Oct. 26, 1948

2,452,267

UNITED STATES PATENT OFFICE 2,452,267

ELEVATABLE BED TRAILER

Arthur G. Schramm, Phoenix, Ariz.

Application April 15, 1947, Serial No. 741,458

5 Claims. (Cl. 280—6)

This invention pertains to elevatable bed trailers.

One of the objects of the invention is to provide a trailer having independently sprung and supported crank type wheel spindles:

Another object is to provide the independently sprung wheel spindles with hydraulic means for raising and lowering the wheels so that either wheel may be raised or lowered at will, or more spring tension can be applied to either wheel to offset varying lateral loading.

Another object is to provide hydraulic means for actuating the wheel spindle cranks combined with locking mechanism so that the spindle cranks may be supported at various positions independenly of hydraulic pressure within the mechanism.

Another object is to provide a hydraulic pump cooperative with independent wheel crank operative mechanism whereby fluid may be delivered to each of two pistons selectively in varying quantities by a manual pump conveniently located on the front end of the trailer body; the parts being arranged so that pressure may be released from either of two elevating hydraulic cylinders independently or at the same time, and also so that manual operation of the pump lever will deliver hydraulic fluid alternately to each of two pistons, operating the spindle cranks or optionally to either independently.

A still further object is to provide a trailer having independently operative and sprung crank supported wheel spindles, with mechanism whereby its tongue may be hitched or unhitched from the draft vehicle by operation of the hydraulic mechanism; and further Another object of the invention is to provide a trailer having a bed, a hitching tongue, independently operating crank type wheel mountings operable so that the bed may be lowered level, or at any desired lateral or longitudinal slant while hitched, or while unhitched.

Other objects will appear hereinafter.

I attain the foregoing objects by means of the device, constructions and arrangement of parts shown in the accompanying drawings, in which Figure 1 is a side elevation of a trailer embodying my improvements and shown in normal riding position;

Figure 2 is a side elevation thereof, showing the wheel elevating mechanism in a position to lower the bed of the trailer at the rear end for loading;

Figure 3 is a similar view showing the rear end of the trailer bed raised above normal running level to receive loads from elevated platforms;

Figure 4 is a plan view of the trailer shown in Figure 1;

Figure 5 is a front end view showing the trailer in a laterally tilted position;

Figure 6 is a sectional side elevation of one of the hydraulic wheel spindle arm operating elements, drawn on an enlarged scale;

Figure 7 is an end view thereof drawn on a still further enlarged scale;

Figure 8 is a transverse section thereof taken on line 8—8, Figure 6, drawn on the larger scale;

Figure 9 is a side elevation of the interior details of the slide latching mechanism;

Figure 10 is a side elevation of a fragmentary part of the exterior of the slide mechanism;

Figure 11 is a vertical section through the hydraulic pump used to actuate the hydraulic cylinders; and Figure 12 is a fragmentary end view of a crank arm hub drawn on a somewhat enlarged scale.

Similar numerals refer to similar parts in the several views.

The body 2 of the trailer includes a flat bed 3, side frames 4, a front end frame 5, and a tongue 6 having a conventional ball hitch 7.

On each side of this body and at a convenient balancing position wheel spindle arms or cranks 10 are attached to the bed. These consist of stub crank shafts 11, crank arms 12, and wheel spindles 14 which are of the usual ball or roller bearing type, and journalled riding wheels 15.

On each crank 10, at the junction of shaft 11 and arm 12 a hub 16 is formed to provide a bedding plate 17 for a leaf spring 18 so that it extends substantially at right angles to arm 12. Bolts 19 are used to secure these springs in position. In normal riding position the arms 12 extend rearward substantially in a horizontal plane, and springs 18 extend upwardly. The top of each of the springs is joined to lugs welded to the bottom of a tubular slide 20 by forming a pin and clevis joint 22.

These slides operate along slide tubes 23 and are joined to protective sleeves 24 which work over hydraulic cylinders 25.

The front ends of hydraulic cylinders 25 and slide tubes 23 are fitted into and held in parallel position by blocks 26 pivotally mounted on upright body frame members 28. Within cylinders 25 are cylindrical pistons 30 equipped with sealing cups 31 at the forward end. The rear ends of these pistons are threaded and screwed into tubular protective sleeves 24 which slide over the outside of cylinders 25. The forward ends of these sleeves are welded to sleeves 32 which are, in turn, welded to the tubular portion of slides 20. When pressure is introduced into cylinders 25 the pistons move the sleeves which move the slides and these swing the springs by means of clevis joints 22. Each slide and its attendant mechanism is the same except that they are made in right and left pairs.

As each slide moves along its slide tube 23 it is necessary to provide means for locking or latching it at several predetermined positions. To do this a plug 38 is fitted into the rear end of the slide tube 23. Each plug has a partial cross groove 40 to accommodate a pivotally acting dog 41, which is mounted on a spring shaft 42 eccentrically journalled in groove 43 and extending along the length of the slide tube. The forward end of each of the shafts 42 is again journalled in a plate 44 at the forward end of the slide tube. A leaf spring latch lever 49 having a knob 46 is attached to the forward end of shaft 42, and positioned to be releasably detained in either outer notch 52 or inner notch 54. These notches are formed on the outer face of plate 44 and are separated by lug 56. A curved locking pin 45 is part of dog 41 and is proportioned to protrude out through a hole 47 in the wall of tube 23 when rotated by shaft 42. Holes 50 are drilled at several positions along slide 20 and positioned to receive the outer end of dog pin 45 when in longitudinal registering position. When the left hand latch lever 49 is set in outer notch 52 spring torsion is exerted through shaft 42 tending to force the dog pin out through any one of holes 50 in the slide. As the slide moves along tube 20 the dog pin 45 will engage in the first slide hole brought into register. Conversely, if the pin is engaged in a slide hole, and bound by pressure of the slide, the lever 49 may be moved to the right and set in notch 54. Torsion in shaft 42 then urges the pin to withdraw from the locking hole in the slide and, as soon as the slide is moved sufficiently to relieve the binding effect, the dog moves the pin into the tube and the slide is released. The position of notches 52 and 54 is reversed on the corresponding parts on the opposite side of the trailer.

Hydraulic fluid is supplied to each cylinder 25 through flexible tubes 58 joining metal tubes 60. These lead to separate outlets in the composite pump 63.

The pump has two oppositely positioned cylinders 64 and 65 arranged over an oil sump 65a. The pistons 73 of each cylinder are provided with piston rods facing each other and joined to a manual operating lever 66 by joint 67.

The handle 66 extends upward from its pivot bearing 70 to afford adequate leverage for operating.

Outlet valves 72 are connected through pipes 60 and 58 to cylinders 25. Return ports 74 from these cylinders controlled by valves 75 lead to oil sump 65a. Intake openings lead from the sump 65a through inlet valves 78 to the cylinders 64 and 65, but bypasses 77 lead from junctions 79, nearer the cylinder than the intake valves 78. A double two way plug valve 80 controls these bypasses; its ports being arranged so that either left or right cylinder 64 or 65 may be rendered inoperative by moving lever 71 so as to open the ports on one side direct to the sump. In the position shown in Fig. 5, left cylinder pumps while the bypassed right cylinder merely draws oil in and out from the sump. Thus more hydraulic pressure is applied on the left side and the trailer bed may be tilted accordingly.

In use, the trailer may be first attached to the hitch ball 82 on a draft vehicle 83 and then loaded in the usual manner.

If heavy objects are to be loaded, however, the spindle arms 10 may be moved to let the trailer bed down, as shown in Figure 2. With the hitch remaining connected, the bed assumes a rearwardly tilted position with the rear edge of the bed contacting the ground. Obviously, if the hitch is removed, the bed will rest level on the ground. After loading the bed is raised by lowering the spindle arms by operation of pump 61, until the desired level is reached.

Hitching and unhitching is accomplished either loaded or unloaded by swinging the fulcrum legs 84, which are pivotally attached to each side of the frame, downward to extended position, as shown in dotted outline, Figure 1. These legs rest on the ground and form a rocking support for the forward part of the trailer. With these legs extended, lowering of the spindle arms raises the hitch 7 from the draft ball 82. Conversely, raising the rear portion of the trailer lowers the hitch socket on the hitch ball. With the legs raised and retracted, and with the hitch locked, it is possible to elevate the rear end of the trailer bed to level it with somewhat elevated platforms, by lowering arms 10 below normal riding position. When this is done the hitch keeps the front end down, and as the spindle arms are lowered the rear end of the bed is raised as shown in Figure 3.

When loading conditions require greater support on one side of the bed than the other, more hydraulic pressure may be applied on the side needing the greater support. This is done by moving the bypass handle 71 to the position shown in Figure 5. This turns the valve plug 80 so that right cylinder is inoperative and, as the pump lever is operated, only the left cylinder 64 operates and pumps fluid into the corresponding left cylinder 25. The same means can be used to hold the trailer bed at a lateral slant, so as to maintain the bed level laterally when traveling along slanting terrain. Thus an orchard spray tank may be maintained level over rough slanting ground.

From the foregoing it will be seen that I have provided a universally adaptable trailer with a bed which can be lowered at will, and wherein each wheel is independently supported, independently sprung and individually operable. Since the wheel supporting arms are not mechanically interconnected the hydraulic mechanism acts as sole elevating medium. Switching the hydraulic pressure from one side to the other will level unevenly positioned loads. After elevating to the desired position the slides 20 are mechanically latched or locked to tubes 23 by the latching mechanism above described. Therefore, the hydraulic lifts do not have to sustain the weight of the trailer while traveling. It is to be noted that operation of the pump lever 66 does not lift the whole weight of the trailer on either the right or left stroke, but each side is lifted alternately. Thus it is necessary for the operator to supply force sufficient to lift only half of the entire weight of the trailer on any one stroke. This secures a mechanical advantage in operation, and the corresponding arrangement of the pump part makes possible the bypassing of portions of the fluid for leveling, as described. Lowering of the bed is accomplished by first releasing the dog pins 45, and then opening valves 75 and 76. Valve 75 lets the left side down and 76 the right side. Both may be released at once or they may be operated independently.

I am aware that there are various crank arm wheel spindle supports known to the art, however I have here disclosed new mechanisms which give improved performance to this type of wheel suspension, and thus add to the overall utility of the trailer.

Accordingly, it is intended that the following claims be given a liberal construction.

I claim:

1. A trailer having a body including a bed, wheel spindle supporting arms having stub attaching shafts journalled on each side of said bed, wheel spindles carrying wheels positioned at the outer ends of said arms, and leaf springs attached to said arms at their junction with said stub shafts extending angularly upward therefrom, hydraulic cylinders and parallel slide tubes pivotally attached to the forward portion of said trailer body and extending rearwardly along the sides thereof, pistons in said cylinders operating slides supported on said parallel slide tubes, latch mechanism operative on said slides to detain them on said slide tubes; and a hydraulic pump adapted to deliver fluid under pressure to said cylinders independently and selectively.

2. In a trailer having a body with a frame, a bed, and a tongue, wheel suspension mechanism, including transverse stub shafts journalled in bearings supported on each side of said trailer bed, hubs attached to the outer ends of said shafts, radial crank arms normally extending rearwardly and substantially horizontal therefrom, wheels carried on outwardly extending spindles at the ends of said arms, and leaf springs bedded on said hubs and extending radially upwardly therefrom; crank arm operative mechanism including parallel hydraulic arm operative cylinders and slide tubes joined at their forward ends and pivotally supported on each side of the forward portion of the trailer body on horizontal pivots and extending rearwardly along each side of said body, pistons operative in said cylinders joined to slides operative along said slide tubes, clevis joints connecting said slides with the upper ends of said springs, and latching means including resiliently engaging dogs, having lock pins engageable in said slides, operative between said slides and slide tubes; together with means for operating said slides including a hydraulic pump positioned on said trailer body having left and right opposing cylinders, pistons operative therein by an intermediately positioned handle, a fluid sump, inlet and outlet valves and connecting tubes whereby each pump cylinder is operatively connected to the arm operative cylinder on its respective side, by-pass valves for rendering either cylinder unoperative and manually operated valves for releasing fluid from said arm operative cylinders into said sump.

3. A trailer comprising, in combination, a body having a frame and a bed, a tongue having a hitch at its forward end, and fulcrum legs pivotally attached to the forward portion of said body adapted to elevate said hitch above hitching level when the rear portion of said body is lowered, together with wheels supported on rotatable crank arms, springs bedded radially on said crank arms and attached to horizontal slides operative along the sides of said trailer body adapted to rotate said crank arms, hydraulic cylinders operatively associated with said slides, latching means to retain said slides in position, and a hydraulic pump adapted to supply fluid under pressure to said cylinders.

4. A trailer of the elevatable bed type comprising a body structure including a bed, a tongue and hitch at the forward end and side members; wheel suspension formed by stub shafts independently journalled on each side of said bed, radially extending crank arms at the outer ends of said shafts attached by hub pieces provided with spring bedding plates at approximately right angles to said arms, wheel spindles extending outward from the ends of said arms, and wheels journalled thereon, said arms normally extending horizontally rearward when in riding position; leaf springs bedded on said arm hub plates and extending radially therefrom substantially at right angles to said arms; mechanism to rotate said crank arms including cylindrical slides operative on slide tubes and attached to the outer ends of said springs by clevis joints, slide tubes extending along the sides of said trailer body, pivotally mounted to said body at the front portion thereof, hydraulic lifting cylinders parallel to said slide tubes having pistons connected to said slides; slide latching mechanism including dogs eccentrically journalled on torsion spring shafts in said slide tubes having locking pins adapted to protrude substantially radially through the walls of said slide tubes and into holes formed along the length of said slides when said dogs are rotated, said torsion shafts extending beyond the forward end of said slide tubes and being attached to latch levers adapted to be detained at rotative positions whereby said dog locking pin is resiliently urged to protrude from said tube, or to retract thereinto; together with means for supplying fluid under pressure in predetermined quantities to said cylinders selectively.

5. A trailer of the elevatable bed type comprising a body structure including a bed, a tongue and hitch at the forward end and side members; wheel suspension formed by stub shafts independently journalled on each side of said bed, radially extending crank arms at the outer ends of said shafts attached by hub pieces provided with spring bedding plates at approximately right angles to said arms, wheel spindles extending outward from the ends of said arms and wheels journalled thereon, said arms normally extending horizontally rearward when in riding position; leaf springs bedded on said arm hub plates and extending radially therefrom substantially at right angles to said arms; mechanism to rotate said crank arms including cylindrical slides operative on slide tubes and attached to the outer ends of said springs by clevis joints, slide tubes extending along the sides of said trailer body, pivotally mounted to said body at the front portion thereof, hydraulic lifting cylinders parallel to said slide tubes having pistons connected to said slides; slide latching mechanism including dogs eccentrically journalled on torsion spring shafts in said slide tubes having locking pins adapted to protrude substantially radially through the walls of said slide tubes and into holes formed along the length of said slides when said dogs are rotated, said torsion shafts extending beyond the forward end of said slide tubes and being attached to latch levers adapted to be detained at rotative positions whereby said dog locking pin is resiliently urged to protrude from said tube, or to retract thereinto; together with means for supplying fluid under pressure in predetermined quantities to said cylinders selectively, including a manually operated pump mechanism having opposed independently operative pump cylinders having intake and outlet valves each arranged to draw fluid from a storage sump and force it into said lifting cylinders, together with manual valves arranged to release fluid from said lifting cylinders into said sump, and manually controlled valves arranged to render either pump cylinder inoperative by by-passing the intake valves thereof and connecting the cylinder directly to said sump.

ARTHUR G. SCHRAMM.

REFERENCES CITED

The following references are of record in the file of this patent:

UNITED STATES PATENTS

| Number | Name | Date |
| --- | --- | --- |
| 1,941,143 | Wickersham | Dec. 26, 1933 |
| 2,059,205 | Buffington | Nov. 3, 1936 |
| 2,227,762 | Ronning | Jan. 7, 1941 |